March 22, 1927.
O. GOTTSCHALK
1,622,105
ATTACHMENT FOR MEASURING INSTRUMENTS
Filed Oct. 30, 1925
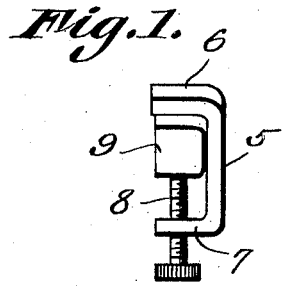
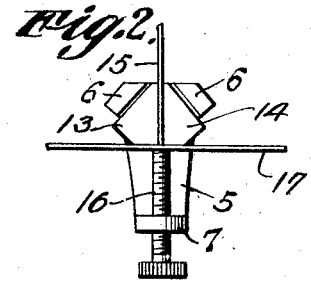
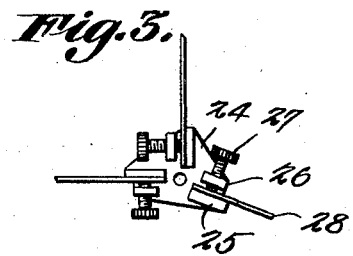
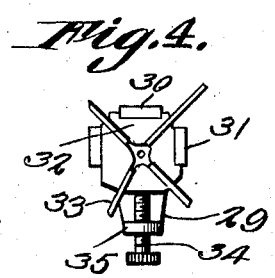
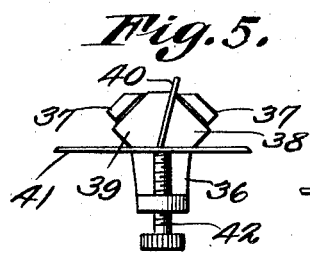
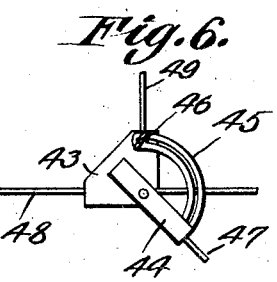
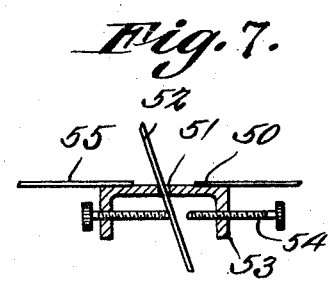
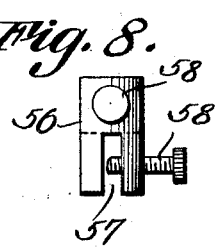
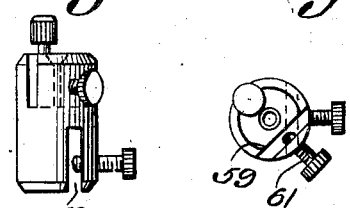
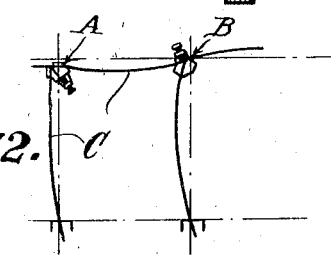
Otto Gottschalk
Inventor
By C. A. Snow & Co.
Attorneys Patented Mar. 22, 1927.

1,622,105

UNITED STATES PATENT OFFICE.

OTTO GOTTSCHALK, OF BUENOS AIRES, ARGENTINA.

ATTACHMENT FOR MEASURING INSTRUMENTS.

Application filed October 30, 1925. Serial No. 65,857.

This invention relates to an apparatus for determining statical calculations of structures and more particularly to devices for composing and deforming flexible models of structural buildings, giving instantaneously correct results, especially for bending moments at any section desired, the same being more particularly designed for use in connection with the measuring instrument shown in my pending application filed May 9, 1923 and bearing Serial Number 637,872.

Heretofore automatic statical calculations of bending moments could be carried out only by determining reactions or moments at supports, whilst the intermediate sections had to be calculated from results thus obtained entailing errors and loss of time and obliterating partly the purposes of mechanical calculation.

One of the objects of the present invention is to provide and insert into a model composed for statical calculation one beam or other structural member at a time, twisted at section to be determined, deforming the entire model so that its several parts are curves proportional or equal to the influence line of bending moments at interrupted section.

Another object of the invention is to provide holders by which two pieces of elastic metal tape might be rigidly joined at a certain angle, forming thus a twisted beam as mentioned before.

Another object of the invention is to provide a clamp or holder as before stated and consisting of an exterior body and interchangeable clamping members adjustable to angles desired, allowing the same body to be used for several different metal tapes.

Still another object of the invention is to provide holders for securing measuring tapes of various angles with respect to each other to permit the construction of models with facility.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a securing device constructed in accordance with the invention.

Figure 2 is a plan view illustrating a modified form of the securing device.

Figure 3 is a further modified form of the invention.

Figure 4 is a plan view of a still further modified form of the invention.

Figure 5 is a securing device, the movable block forming a part thereof being of a modified construction.

Figure 6 is another modified form of the invention.

Figure 7 is another modified form of the invention.

Figure 8 is a still further modified form of the invention.

Figure 9 is a plan view thereof.

Figure 10 illustrates another form of securing device.

Figure 11 is a plan view thereof.

Figure 12 is a diagrammatic view illustrating the use of the securing devices.

Referring to the drawing in detail, Figure 1 illustrates a securing member including a body portion 5 having spaced upwardly extended fingers 6 and an upwardly extended finger 7, the upwardly extended finger 7 being disposed at the opposite end from the finger 6.

A threaded opening is formed in the finger 7 for the reception of the set screw 8 that is adapted to engage the blocks 13 and 14 shown in Figure 2, which have inclined surfaces cooperating with the inner surfaces of the fingers 6 to clamp the flexible members 10 therebetween, the flexible members being formed preferably of lengths of machined metal tapes 15 and 17.

A still further form of securing device is illustrated by Figure 3 and which embodies a base 24 provided with upstanding lugs 25 and 26 respectively, the lugs 26 being formed with threaded openings for the reception of the set screws 27 that operate to connect the flexible strips 28 to the lugs 25.

This base 24 may also be constructed as a ring upon which the lugs 25 are conveniently fixed. Thus it will be seen that the strips 28 may be held at various angles with respect to each other in such a way that the strips will not move with respect to the securing device.

As shown by Figure 4, the body portion which is indicated at 29 is provided with an upwardly extended end lug 30 and lateral lugs 31, which cooperate with the blocks 32 that are provided with inclined edges, the inclined edges of the blocks cooperating to clamp the flexible members 33 therebetween. These blocks are secured in position by means of the set screw 34 that operates through a suitable opening in the lug 35, and it will be seen that when the set screw 34 is moved inwardly, a clamping action is set up between the blocks and lugs 31.

The construction as shown by Figure 5 is similar to that shown by Figure 2 and includes a body portion 36 and lugs or fingers 37 that engage the blocks 38 and 39 respectively, the blocks having inclined adjacent edges to support the bendable member 40 at an angle with respect to the member 41 which engages the inner surfaces of the blocks.

The set screw 42 operates to force the member 41 into close engagement with the blocks 38 and 39. The reference character 43 illustrates the base of the securing device as shown by Figure 6 to which base the arm 44 is pivotally connected, the arm 44 being provided with a curved extension 45 formed with a slot to accommodate the set screw 46 that holds the arm 44 in various positions of adjustment.

The arm 44 is provided with a suitable securing device for securing the member 47 to be bent or deformed thereto, the idea of the invention being to provide means whereby the angle of the member 47 may be changed with respect to the members 48 and 49 that are to be bent.

In Figure 7 the body portion which may be of any desired formation, is indicated at 50 and is shown as having an opening 51 therein, the opening being relatively large to accommodate the flexible member 52. Lugs 53 form a part of the body portion 50 and have threaded openings to receive the set screws 54 that may be adjusted to engage the member 52 at any desired place to hold the member 52 at any predetermined angle with respect to the members 55 which are also secured to the body portion 50.

In the form of the invention as shown by Figures 8 and 9, the reference character 56 indicates the body portion which is circular in cross section and provided with cut out portions 57 arranged in the opposite ends thereof and disposed in opposite directions. A set screw indicated at 58 passes through one of the walls of the respective cut out portions and acts to clamp the sections to be bent therebetween.

Figures 10 and 11 illustrate a still further modified form of the invention which also includes a body portion provided with cut out portions 59 and 60 which cut out portions are arranged at oblique angles with respect to each other for the reception of the flexible members connected by the device.

Set screws 61 are employed as means for clamping the flexible members within the cut out portion.

Figure 12 illustrates a diagrammatic view showing the manner of using the securing devices for securing the ends of the flexible sections of which an elastic model is formed and illustrating the connectors A and B which are of different constructions to insure a correct bending of the flexible members or sections, which are indicated at C.

In the use of the device in calculating the bending moment of a portal frame of several openings, elastic members are arranged in direct similarity with the plan of the structure, the axis of which is shown in dotted lines in Figure 12, the securing members being positioned at the top beam. The angles between the elastic members are bent or distorted by means of a securing device as shown by Figure 7, the screws 54 being moved against the elastic members causing them to bend and indicating the bending moments at any section desired.

While I have illustrated the use of certain securing devices, it is to be understood that the various other securing devices may be used in constructing models of various shapes and designs.

I claim:—

1. In a device of the class described, flexible metallic strips, securing members including body portions, clamping means carried by the body portion for clamping the ends of the flexible metallic strips together to form a model of an entire structure, and means for bending the strips.

2. In a device of the class described, flexible metallic strips, securing members including body portions, clamping members for clamping the ends of the strips together to provide a model of a permentent structure, and means for exerting a pressure on certain strips to bend the strips at points intermediate the securing members.

3. In a device for determining statical calculations including flexible strips, securing members for connecting the adjacent ends of the strips, said securing members adapted to hold the strips at various angles with respect to each other, and means positioned on the ends of certain strips for bending the strips at points between the securing members.

4. In a device for determining statical calculations including flexible strips, securing members for connecting the adjacent ends of strips, pressure members including body portions having central openings to receive the ends of certain flexible strips, and means supported by the body portions for exerting pressure on the strips to bend the strips at points between the securing members.

In testimony that I claim the foregoing as my own, I have hereto affixed my signature.

OTTO GOTTSCHALK.